US008504455B1

(12) United States Patent
Balestreire et al.

(10) Patent No.: US 8,504,455 B1
(45) Date of Patent: Aug. 6, 2013

(54) ACQUISITION WAVE MANAGEMENT

(75) Inventors: Joseph J. Balestreire, Glenshaw, PA (US); Matt Bruhn, Pittsburgh, PA (US); John DeMarchis, Trafford, PA (US); Anthony McIntyre, Westlake, OH (US); John Wilkinson, Gibsonia, PA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 150 days.

(21) Appl. No.: 12/873,891

(22) Filed: Sep. 1, 2010

(51) Int. Cl.
*G06Q 40/00* (2006.01)
(52) U.S. Cl.
USPC .......... 705/35; 705/38; 705/39; 705/40; 705/42; 705/43; 705/44; 705/45
(58) Field of Classification Search
USPC .................................. 705/35, 15–45
See application file for complete search history.

(56) References Cited

U.S. PATENT DOCUMENTS

| | | | | |
|---|---|---|---|---|
| 6,915,270 | B1* | 7/2005 | Young et al. | 705/7.29 |
| 7,415,617 | B2* | 8/2008 | Ginter et al. | 713/189 |
| 7,958,186 | B2 | 6/2011 | Kol et al. | |
| 2002/0184191 | A1* | 12/2002 | Marpe et al. | 707/3 |
| 2004/0249658 | A1* | 12/2004 | Schwerin-Wenzel et al. | 705/1 |
| 2005/0015333 | A1* | 1/2005 | Schwerin-Wenzel et al. | 705/39 |
| 2008/0120129 | A1* | 5/2008 | Seubert et al. | 705/1 |

OTHER PUBLICATIONS

"Bank Merger Reform Takes an Extended Philadelphia National Bank Holiday", Edward Pekarek, Michela Huth, Fordham Journal of Corporate & Financial Law, v13n4, pp. 595-703, 2008, ISSN: 1532-303X. Retrieved from Dialog.*
U.S. Appl. No. 12/873,911, filed Sep. 1, 2010.
Morrall, Katherine, "Managing a merger without losing customers", Bank Marketing, Mar. 1, 1996, accessed from http://www.allbusiness.conn/sales/customer-service/562016-1.html, pp. 7-10.
Office Action dated Mar. 26, 2012 for U.S. Appl. No. 12/873,911, filed Sep. 1, 2010.

* cited by examiner

*Primary Examiner* — Hai Tran
(74) *Attorney, Agent, or Firm* — Buchanan Ingersoll & Rooney PC; Robert J. Pugh

(57) ABSTRACT

Enhanced systems, processes, tools, techniques and strategies are provided for executing corporate entity changes between or among institutions, particularly with respect to minimizing the negative effects of the corporate change on customers of the institutions. In various embodiments, a method is provided for determining a wave assignment for a customer in connection with multiple waves of the corporate change. The method may include establishing a baseline wave assignment for customers of the acquired institution based on customer account data; determining lines of business associated with the customer account data; and, applying wave assignments to the customer account data in response to the baseline wave assignments and the lines of business, among other potential factors.

20 Claims, 11 Drawing Sheets

| Acct_ID | Conv_phase_ID | Cmnt | Begin_eff_date | End_eff_date | Current_flag |
|---|---|---|---|---|---|
| 12345 | 3 | Dominant wave | 06/21/2009 | 1/25/2010 | N |
| 12345 | 4 | Customer care request | 1/26/2010 | NULL | Y |

FIG. 8

| Known Impact | Solution |
|---|---|
| Incomplete Listing of Accounts within Online Banking | Clients will have inquiry access to all accounts through websites of either institution |
| Incomplete Listing of Accounts via Telephone Banking | Clients will have inquiry access to all accounts through telephone banking service of either institution |
| Combined Statements are Incomplete | Clients will receive separate statements for each account |
| Unable to transfer funds between accounts via Online Banking or Phone | 1. Acquiring institution External Transfer Service<br>2. Wire transfer service<br>3. Write a check |
| Scheduled Online Transfers | If client had a scheduled transfer, they will need to cancel it and establish in on the acquired institution Internal transfer system. |
| Unable to withdrawal funds via card | 1. Order card if one has not been received and expedite delivery<br>2. If card is not working, check accounts on it. May need to order ATM or Debit card for accounts that did not convert.<br>3. Request Emergency Cash Process |
| Need to make a deposit with no branch access | 1. Deposit funds via ATM<br>2. Deposit into account and perform external transfer<br>3. Deposit into account and perform wire transfer<br>4. Bank by Mail<br>5. Snowbird procedure |
| Client insists on all accounts converting at one time | 1. Review all options available<br>2. If unacceptable to client escalate the call.<br>Escalation Team will:<br>3. Request wave re-assignment for qualified circumstances<br>4. Close and re-open using Switch Process. |

FIG. 9

| Account Type | Summary |
|---|---|
| Baseline rule for all accounts | Assign account to wave based on ZIP code on account |
| Divested accounts | Divested accounts converted prior to wave 1 |
| Closed accounts | Deposit accounts closed before a certain date will generally not be converted (e.g., retirement accounts are an exception). |
| Health Savings accounts | Health Savings accounts are converted prior to wave 1 |
| Safe Deposit | Safe deposit accounts are assigned to a wave based on the branch where the safe deposit box is located. |
| Affinity credit card account | Wave 1 or Wave 4 |
| Commercial credit card account | Converted prior to wave 1 |
| Out of footprint account | Assign to wave based on where account was opened else default to Wave 2 for PCG or Wave 4 for Retail. |
| Mortgage without a core acquired institution account (i.e., DDA, SAV or MM) out-of-footprint | Wave 1 |

FIG. 10

ACQUISITION WAVE MANAGEMENT

FIELD OF THE INVENTION

The invention generally relates to systems, processes, tools, techniques and strategies for managing mergers and acquisitions of corporate entities such as financial institutions. In various specific embodiments, the invention more particularly relates to tools for managing and executing multiple waves of an acquisition or merger involving a first financial institution and one or more other financial institutions.

BACKGROUND

Corporate changes, such as mergers and acquisitions, may occur for a variety of reasons. For example, a large institution may want to expand by taking over smaller rivals in order to grow even larger. In certain situations, a smaller company may lack the capital necessary to expand, so it might seek a larger partner who can offer the desired capital. Other corporate changes seek to enhance profits by integrating operations, while perhaps also making a larger geographic footprint in the marketplace. In certain circumstances, a merger between institutions may be desirable to expand the variety of products and services that can be offered by either individual institution on its own. Still other corporate changes are defensive, initiated by an institution in response to other changes in the marketplace that threaten the competitive position of the institution.

Regardless of the reason for the corporate change, customers of the entities involved in the change can be negatively impacted. There may be changes in policies, procedures, transactions, or fees required by the acquiring institution that are different from what customers have come to expect from the acquired institution. For example, customers who held checking or savings accounts at an acquired institution may be required to undertake new procedures for making deposits or withdrawals from those accounts. In addition, there may be product pricing differences in terms of interest rates, fee schedules for services, and product feature availability, among other potential differences. If the process of transitioning customers from the acquired institution to the acquiring institution is not performed effectively, dissatisfied customers may take their business elsewhere.

In view of the foregoing issues, enhanced systems, processes, tools, techniques and strategies are needed for executing corporate entity changes between or among institutions, particularly with respect to minimizing the negative effects of corporate changes on customers of the institutions.

BRIEF DESCRIPTION OF THE FIGURES

The utility of the embodiments of the invention will be readily appreciated and understood from consideration of the following description of the embodiments of the invention when viewed in connection with the accompanying drawings, wherein:

FIGS. 7 and 8 schematically illustrate data structures that may be employed in association with certain embodiments of the invention;

FIG. 9 includes a tabulation of examples of the impact of waves on customers and their associated solutions; and, FIG. 10 includes a table summary of examples of applying wave assignments in accordance with certain embodiments of the invention.

DESCRIPTION

Figure 1:
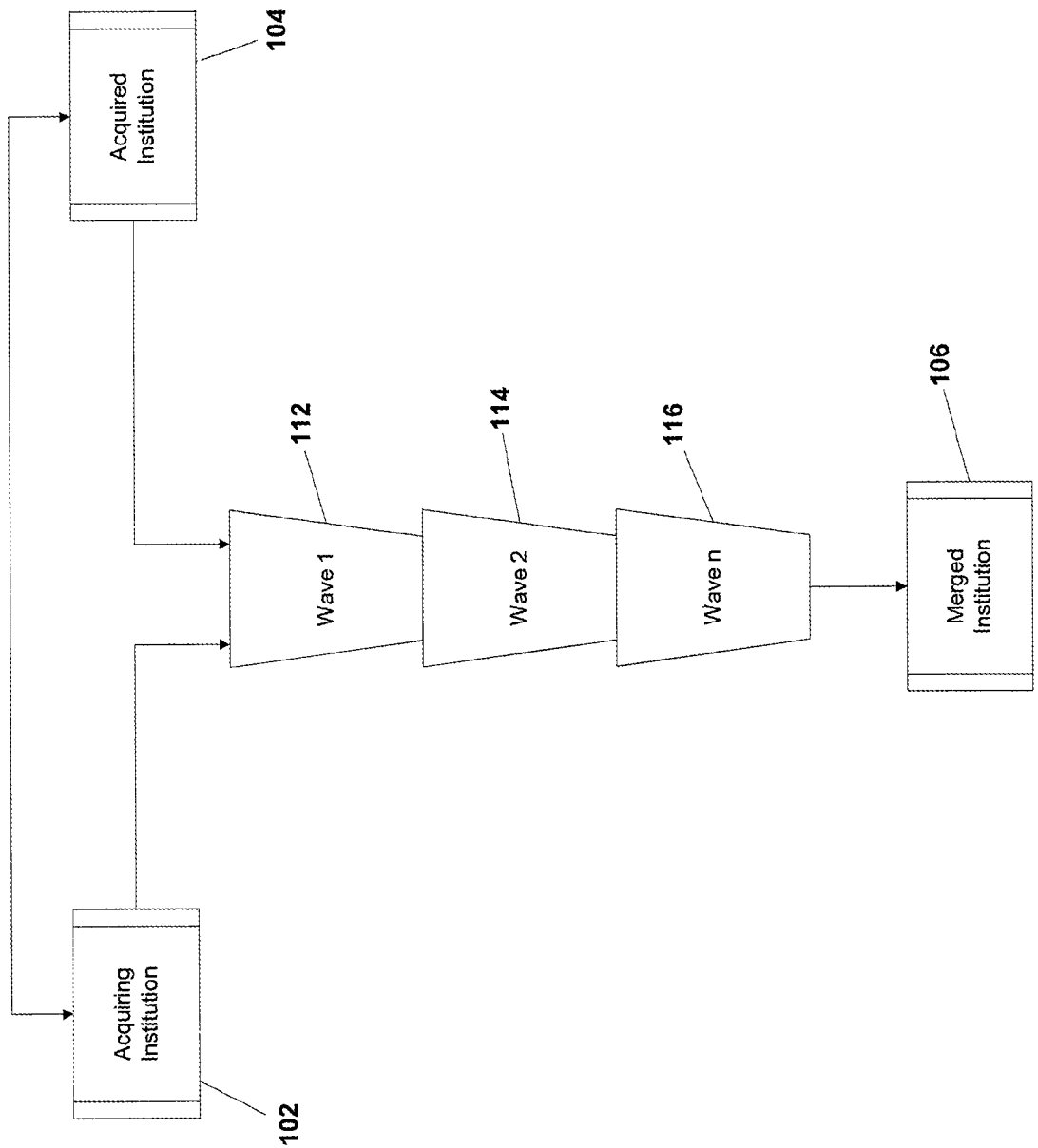
FIG. 1 includes a schematic representation of a multi-wave approach to managing a corporate change between an acquiring institution and an acquired institution.

Embodiments of the invention provide enhanced processes, methods, tools, strategies, and techniques for more effectively and efficiently managing the execution of corporate entity changes. Such corporate entity changes may include mergers, acquisitions, and other like transactions involving corporate entities. For example, with reference to FIG. 1, one such corporate entity change may involve a first financial institution 102 acquiring a second financial institution 104 (or more institutions) resulting in a merged institution 106. In certain embodiments, the first financial institution 102 may be considered the acquiring institution and the second or other financial institutions 104 may be considered the acquired institutions. The financial institutions 102, 104 involved in the corporate change may be banks, for example, that provide commercial and retail banking products and services.

In various embodiments, the invention provides a wave approach to act in the best interest of customers of the institutions 102, 104. As applied herein, a "wave" is a portion or segment of the process that involves transitioning customers and their assets between or among institutions during a corporate change. Various aspects of the invention may provide a multi-wave conversion approach that converts the accounts or other assets of a customer held at an institution within multiple waves 112, 114, 116. As described below in more detail, this wave approach can be coupled with business rules to minimize known negative impacts on customers during a corporate change involving the institutions 102, 104. For example, such business rules can be applied as wave assignment rules or conversion rules executed in a computer system environment in connection with customer data or customer information files ("CIFs").

Various embodiments of the invention may employ multiple factors for developing and applying wave assignment rules and for assigning a customer to a given wave of the corporate change. One such factor involves assessing the kinds of accounts held by the customer with the acquired institution 104. For example, the account factor may involve determining whether customer accounts are open or closed, or whether special rules apply to the account type for regulatory, contractual or system conversion reasons. Another factor involves the line of business (or "LOB") that can be associated with the customer. Commercial and investment banking ("C&IB" or "CIB") and business banking are examples of lines of business, and these LOBs may take priority over other LOBs, such as credit card customers. It can be seen that the account wave assignment provided by embodiments of the invention reflects the priority and business decisions of the LOBs. Other factors to consider include characteristics of the customer, such as where the customer lives, the customer's branch transaction behavior, and the locations where the customer normally conducts business.

Figure 2:
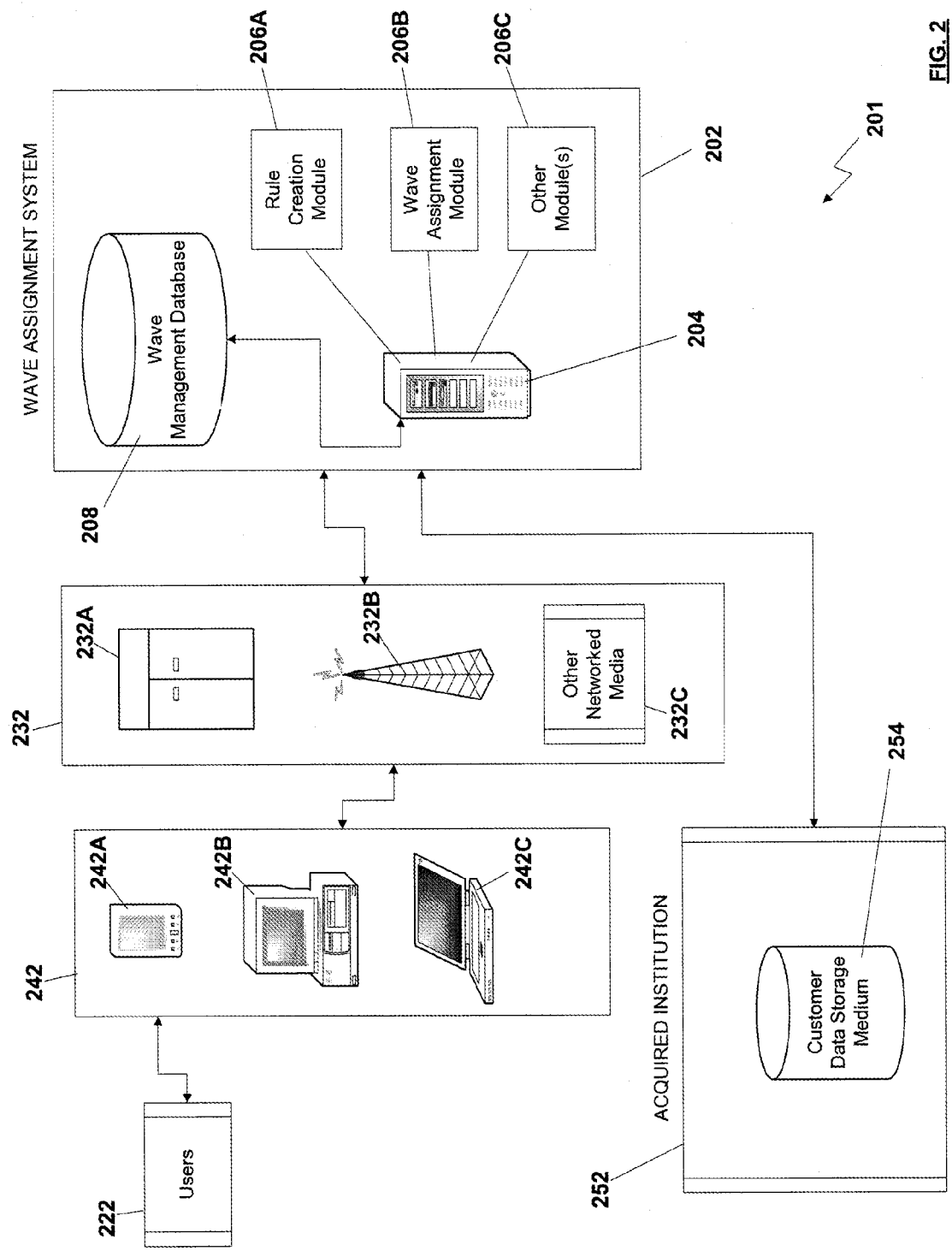
FIG. 2 includes an example of a computer architecture that may be employed in association with various embodiments of the invention.

FIG. 2 illustrates an example of a computer system architecture 201 that can be employed to collect, analyze and process data in accordance with assigning customers to waves in connection with a corporate change. A wave assignment system 202 may include an electronic transaction processor 204 and one or more modules 206A-206C that perform various functions within the system 202. The processor 204 may be embodied as a computer system, for example, such as a server or web server. The modules 206A-206C may be embodied as software stored in the memory of the processor 204, a device, or another apparatus capable of receiving and processing instructions that can be implemented by a computer system. In addition, the system 202 may include one or more data storage media such as wave management database 208 which may be programmed for storing, retrieving, and accessing customer information, information for generating rules, wave assignment data, or other data processed by the system 202. The wave management database 208 can be used as a reference database by conversion personnel to identify customers, accounts, locations, cost centers, and other data pertinent to each wave of a corporate change. Conversion files can be developed from the reference data supplied by the wave management database 208.

The rule creation module 206A may be employed for generation of conversion rules, wave assignment rules, or other business rules that are employed during a corporate change. The wave assignment module 206B may be used to develop and apply wave assignments for customers of the acquired institution in connection with managing the corporate change. In operation of the system 202, various users 222 may interact with the system 202 through a variety of communication media 232 by using various kinds of user access devices 242. Examples of communication media 232 include wireline communications 232A, wireless communications 232B, and networked media 232C, for example. Examples of access devices 242 include mobile devices 242A (e.g., smart phones, mobile phones, personal data assistants, etc.), desktop or home-based computer systems 242B, and laptop computer systems 242C. In addition, the system 202 may be configured to receive and/or transmit data and other information with an acquired institution 252 and one or more customer data storage media 254 of the acquired institution 252.

In various embodiments, multiple data sets maintained by the acquired and acquiring institutions can be integrated with a system infrastructure that links data for both institutions at an account level and/or at a customer level. For the example, the wave assignment database 208 may be linked with the data storage media 254 of the acquired institution 252 for purposes of matching either account level data or customer level data between or among institutions. In certain embodiments, linking data in this manner provides for identification of customers who are (1) only customers of the acquiring institution; (2) customers who are only customers of the acquired institution; and/or (3) customers who are customers of both the acquiring institution and the acquired institution. In various embodiments, both account level data and customer level data can be used to identify customers of the institutions. In certain embodiments, customer level data can be used to manage customers who are only customers of the acquired institution, as well as to manage the customers of both institutions.

It can be appreciated that embodiments of the invention may benefit from establishment of a core cross-LOB leadership team. The inventor has recognized that each primary line of business may have its own specific needs and concerns when it comes to serving customers. To promote proper consideration of these needs and concerns, a cross-LOB leadership team may be created to act as a governing board for customer wave assignment. Core leadership team representation on the cross-LOB team may include representatives from retail banking, business banking, commercial and investment banking, private client group, customer care, and/or other product specific representatives (such as systems for servicing credit cards and lines of credit (e.g., "FDR"), commercial loans, or others). The responsibilities of the cross-LOB team many include decision making on how customers will be claimed and specific processes to handle customer relationships that are split across lines of business; decision making and approval for override criteria; decision making and approval for establishing an override priority hierarchy; and/or other tasks related to the corporate change. In various embodiments of the invention, the decisions of the cross-LOB may be incorporated into business rules that may be executed by various computer systems described herein.

Figure 3:
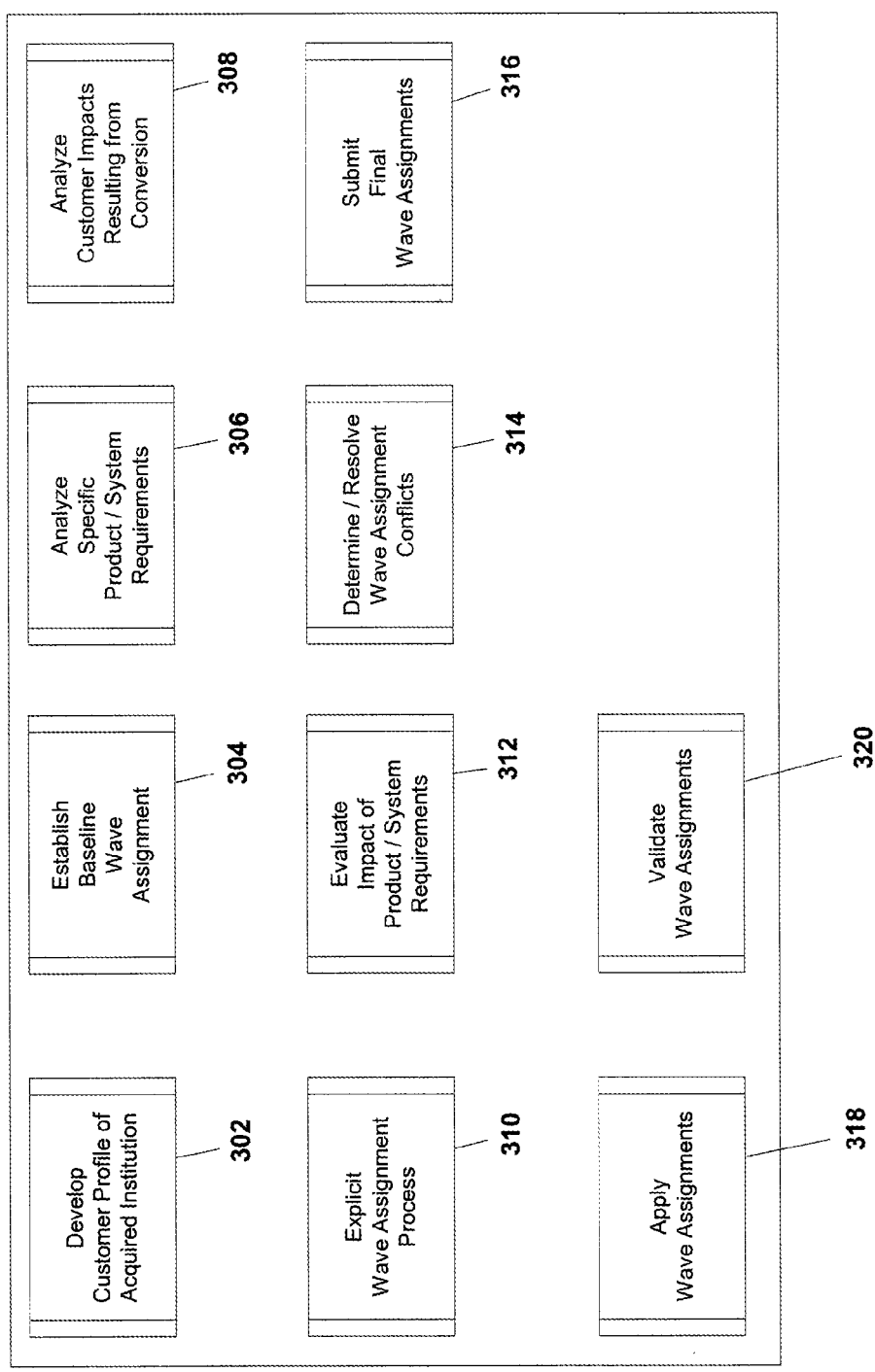
FIG. 3 includes a process flow diagram including examples of process steps that may be performed in association with various embodiments of the invention.
Figure 4:
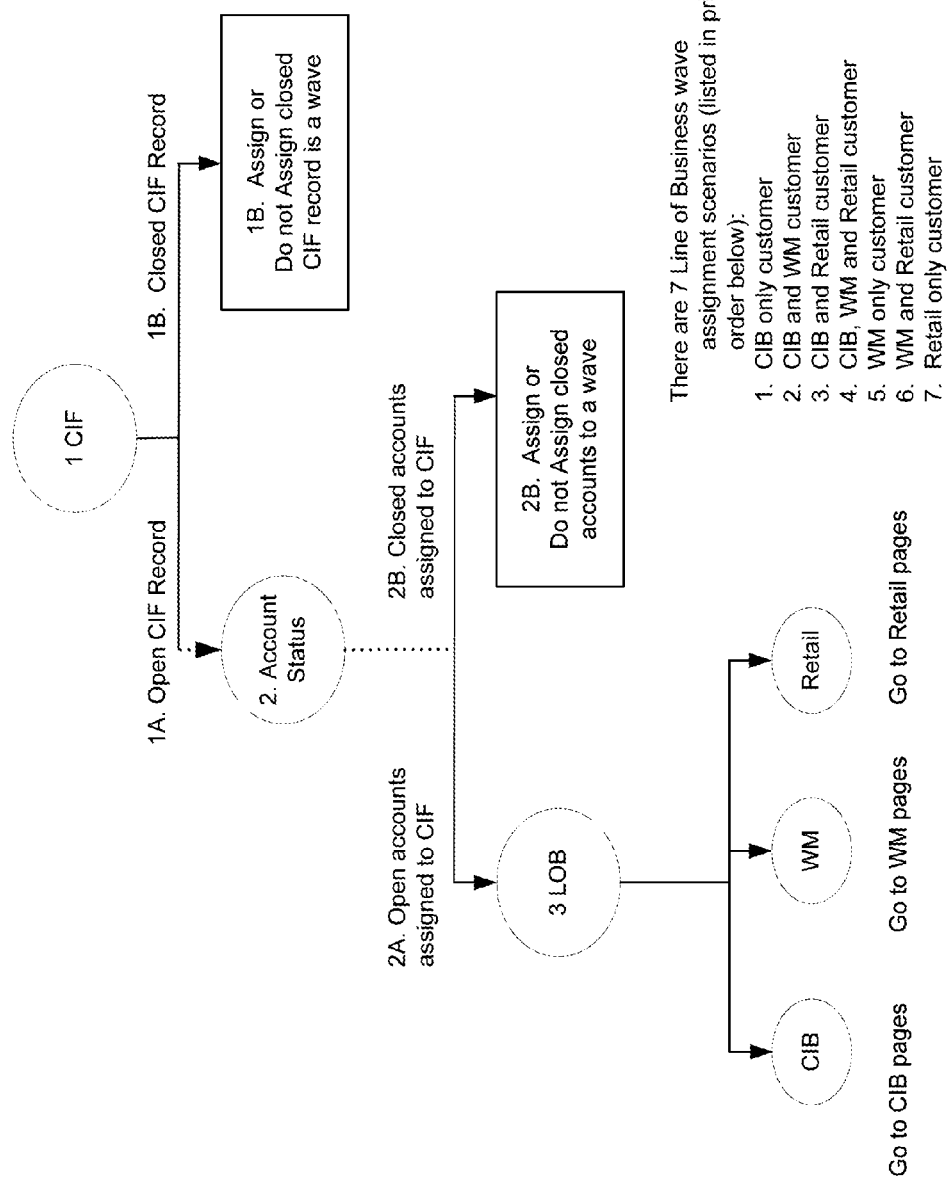
FIG. 4 includes a process flow diagram illustrating an example of analyzing customer information in connection with determining wave assignments.

With reference to FIG. 3, in various embodiments of the process of assigning appropriate corporate change waves to customers, a customer profile of the acquired institution can be developed at step 302. In association with step 302, one or more computer-implementable business rules for wave assignment may be generated that are predicated, at least in part, upon the overall customer profile of the acquired institution. Various core analyses, reports and other information may be used in association with assessing the customer profile of the acquired institution. For example, an LOB profile analysis may be performed that assesses the number of accounts and deposit and credit balances on an LOB-by-LOB basis. The LOB profile analysis can provide insight on the focus of the wave assignment process. At step 302, the process may analyze and determine how each LOB of an acquired institution "claims" its customers. This step 302 may also involve determining whether customers are split across lines of business, and whether such customers should be flagged for special analysis during the wave assignment process since a coordinated effort can be undertaken if multiple LOBs claim ownership of the customer relationship. A high value customer analysis can be performed that recognizes the importance of "high value" customers through customer care focus. For example, high value retail customers split across multiple waves can be identified so that the customer can be kept whole whenever possible. The criteria for considering a customer or household to be "high value" can be determined prior to initiating the wave process. The flow chart of FIG. 4 illustrates an example of a process for defining the basic elements of customer information files in connection with wave assignment.

Figure 5:
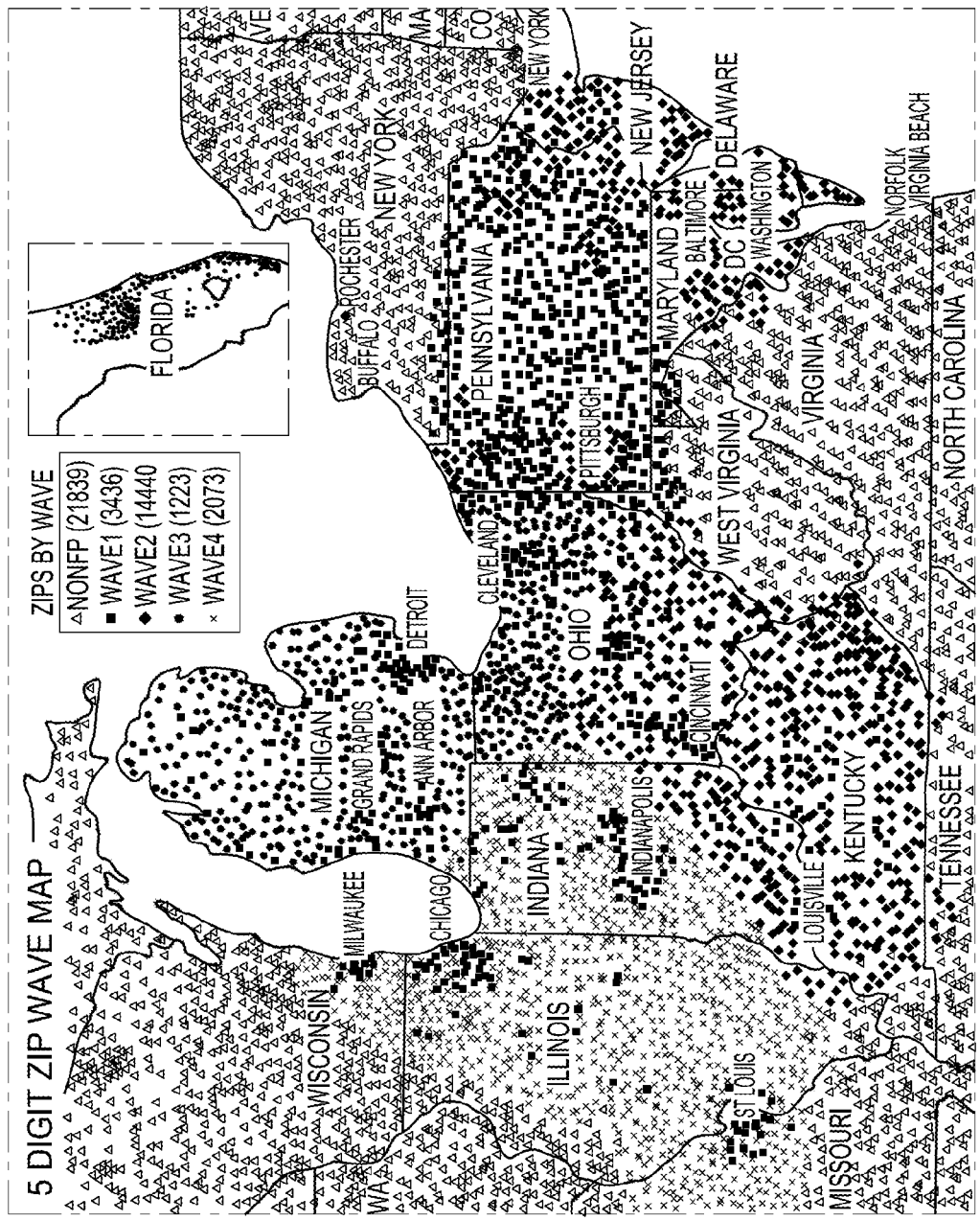
FIG. 5 includes an example of a graphical distribution that can be generated in accordance with various embodiments of the invention.

In addition, a geographical distribution analysis can be performed to gain an understanding of the distribution of "in-footprint" as well as "out-of-footprint" customers of the acquired institution. As applied herein, an "in-footprint" customer is one who is located within the historical geographical market of the institution; whereas an "out-of-footprint" customer is one who is located outside of the historical geographical market of the institution. FIG. 5 illustrates an example of a geographical distribution map that can be generated based on the analysis of step 302. When determining the effect of geographic boundaries on wave assignments, factors such as customer transactional behavior and the natural boundaries can be considered. For example, the wave assignment of a customer who lives in Florida but transacts most of his banking business in Pennsylvania may not be governed strictly by ZIP code.

At step 304, the wave assignment system 202 can be employed to apply one or more criteria for recommending and establishing a baseline wave assignment for customers of the acquired institution. The purpose of establishing a baseline wave assignment is to identify and apply criteria that will work best for a majority of customers (e.g., 80% to 95% or more of the converting customers). The objective is to minimize impact to converting customers and to convert all accounts for a given customer at the same time whenever possible. A ZIP code based assignment assumes that customers do the majority of their business transactions close to where they physically live or reside. Accordingly, customers can be grouped into conversion waves based on their geographical location. In certain embodiments, when a customer is geographically located out-of-footprint of the acquiring institution, using the geographic location of the branch where the last account was opened for that customer can be used to assign a wave to the customer. If the standard business rules for baseline wave assignment do not apply for a specific customer, and specific product or system specific overrides are not applicable (see discussion below), then a default wave can be identified and assigned as a "catch all" wave assignment. In various embodiments, during the wave assignment process, existing customers of the acquired institution may open new accounts with the acquired institution and/or the acquired institution may add new customers. New accounts added may be processed through the baseline assessment and in view of product/system specific wave assignment rules described herein. However, assuring that the appropriate business rules are applied for new accounts may be difficult, particularly at the time of wave lockdown, so plans should be implemented so that new accounts receive proper wave assignments.

At step 306, the system can be used to determine or analyze specific system or product conversion requirements. Various institution products or services may have specific conversion requirements in association with the various waves of conversion that occur during the corporate entity change. For example, safety deposit boxes may be required to convert with the banking branch in which they reside. IOLTA/IOTA and IBRETA accounts may be required to convert in the same wave as their associated servicing organizations. Impaired loans (e.g., loans governed by SOP 03-3) may have specific financial reporting requirements that require them to convert in a specific wave based on computer system or software limitations. There may be other similar system issues that require a subset of loans to be converted at a specific time or within a specific wave. FDR accounts (e.g., Affinity Credit Cards, escripts, LOC, NHE) may have a specific contractual or product based requirement for timing of conversion. FDR control and sub accounts may need to be converted in the same wave as the core account. Overdraft protection accounts may need to be converted in the same wave as the demand deposit account ("DDA") or savings account ("SAV") account that is associated with the protection. Retirement savings accounts with master and sub account relationships may be required to convert in the same wave. Mortgage accounts may be governed by conversion rules that are based on a number of factors including whether the customers were single-product or multi-product, or whether the customers were in-footprint or out-of-footprint from a geographic standpoint. Automated teller machine ("ATM") and debit cards may be required to convert in the same wave as their associated DDA accounts. Treasury management relationships, including billing key relationships, may be required to be converted in the same wave. Commercial loan obligor/obligation relationships may require all CLS accounts for a specific obligor to be converted in the same wave. System related product conversion requirements may impact when an account or asset is converted. For example, a system conversion may be constrained to a particular timeframe so that all products/services housed within that system can be converted within that timeframe.

In another example, employees of the acquired institution are often customers of that institution. Accordingly, employees may be given special attention by customer care during the conversion process, particularly since they may be moving as part of a job re-location resulting from the corporate change. Other examples of accounts or assets that may require special conversion rules include the following: controlled disbursement accounts; health savings accounts (HSAs); internal DDAs; installment loans; liquidated portfolios; divested accounts; zero balance master and sub accounts; or investment accounts.

Figure 6A:
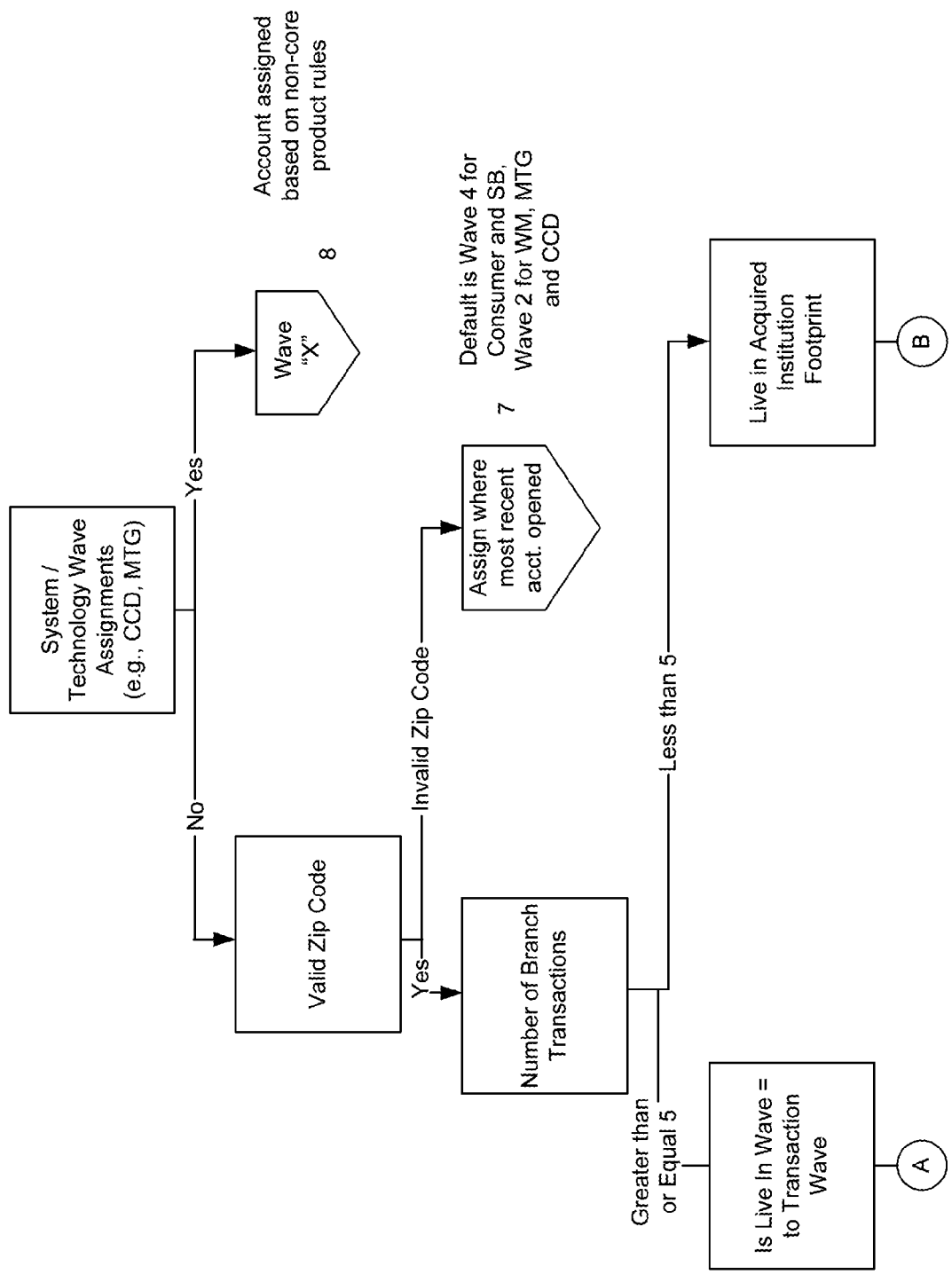
FIGS. 6A and 6B schematically illustrate an example of the operation of a wave assignment rule.
Figure 6B:
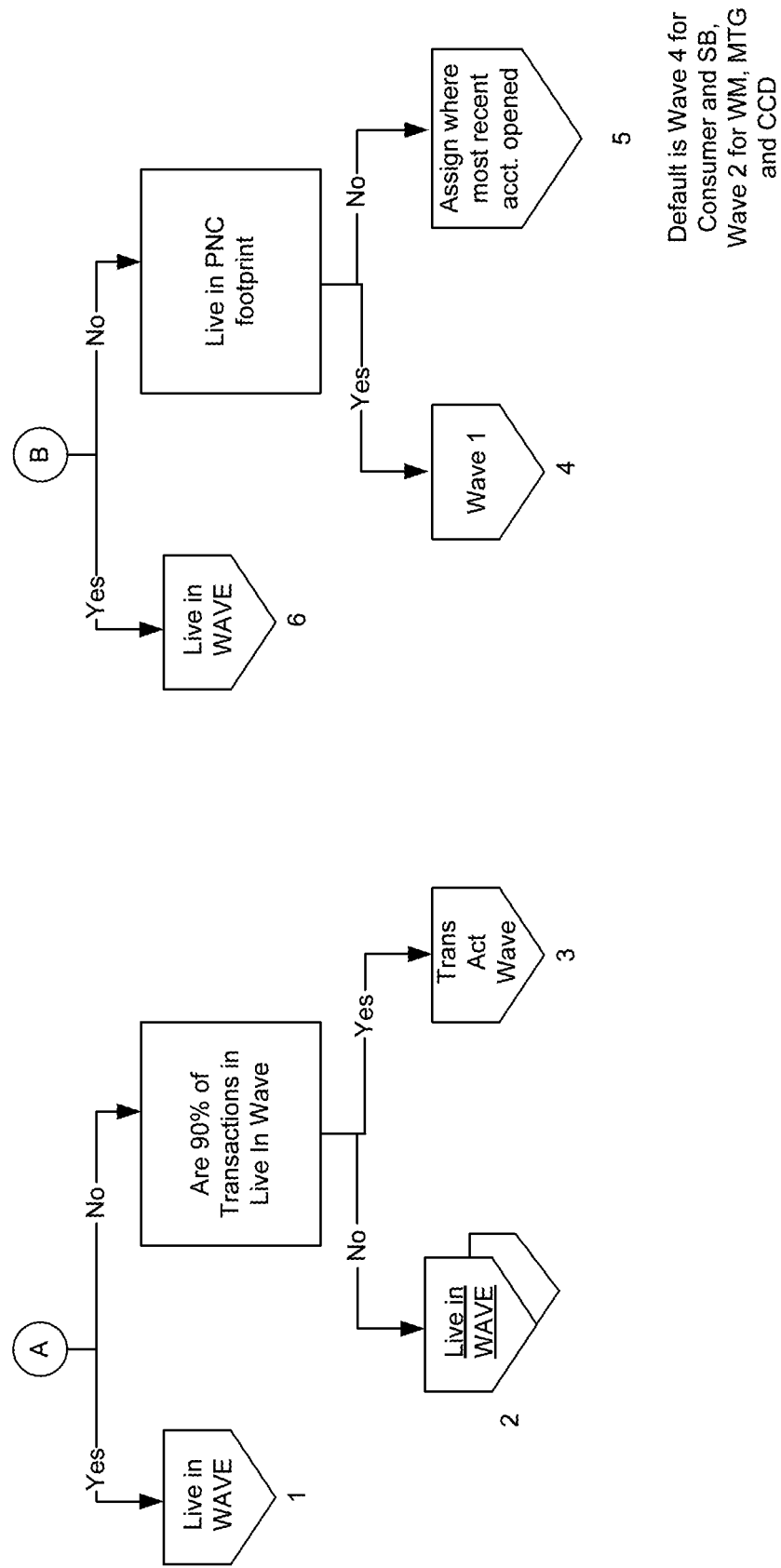

At step 308, various customer impacts resulting from the conversions associated with the corporate change may be analyzed. For example, product and pricing considerations can be analyzed. Converting customer accounts and services from the acquired institution may involve product pricing differences in terms of interest rates, fee schedules for services, product feature availability, and other differences. Such differences should be identified up front so that a product conversion plan including customer care actions can be developed. In this step 308, wave related impacts can be analyzed. Transaction related impacts may assess where a certain volume and/or type of customer transactions occur in association with where the customers actually live geographically (e.g., a "live in" designation, which can be determined by ZIP code). For example, if wave assignment rules determine a wave assignment for customer based on his residence in Cleveland but 100% of that customer's transactions occur in Chicago, then the wave assignment rule may be overridden to designate a wave assignment associated with the Chicago transactions. Such an override should result in no impact to the customer. In another example, if a customer has 75% to 90% of their transactions occurring in a wave assignment other than the wave assignment associated with their residence, then a dominant wave can be assigned to the customer based on this transaction behavior. An override in this circumstance should result in minimal impact on the customer. In another example, transactions by the customer may be mixed between or among geographic locations such that there is no dominant wave. In this situation, the system 202 may default to a wave assignment that is associated with the "live in" wave assignment for the customer. The process flow diagrams of FIGS. 6A and 6B schematically illustrates the operation of an example of a wave assignment rule. As shown, the wave assignment process flow considers factors such as ZIP code and branch transaction volume to determine appropriate wave assignments.

In various embodiments, it may be necessary to account for "new movers" when applying dominant transaction wave assignment overrides to a customer's "live in" wave assignment. If data about customer address changes is available, then it can be used to exclude such customers from a transaction override since their transaction histories may be related to old addresses. This is particularly true of employees of the acquired institution who may be moving due to job relocation resulting from the acquisition.

Special care may be required for handling customers who are split across waves. Product splits that may cause loss of services or function for customers include: DDA/debit splits;

credit card/line of credit and DDA splits; treasury management product splits; obligor/obligation splits; retirement account splits; sweep account splits; ZBA master sub relationships; or, secondary signer splits—e.g., primary signer in Wave 1 and also a secondary signer on an account in Wave 2, so the ability to access the account in Wave 2 may be compromised. It is sometimes necessary for a business to continue doing business on the acquired institution's paper for a period of time although other accounts for that business are converting to the new institution. To support this need, new accounts called "lagging accounts" may be opened under the acquired institution, and they may be kept open until the final phase or wave of the conversion process. A central list of these lagging accounts may be stored in the system 202, so that they can be forced into the final wave and not converted in an earlier wave.

At step 310, a wave assignment process may employ the conversion rules, wave assignment rules, and other factors described herein to make "explicit" wave assignments for customers. In certain situations, an "explicit" wave assignment may be made to override or replace another previously designated wave assignment (e.g., a baseline wave assignment based on customer ZIP code). Components of the wave assignment process may include a number of explicit assignment rules having dependencies on LOB assignment. LOB assignments can be made by applying an agreed upon set of business rules against the wave management database 208 in the system 202 on an automated schedule, for example. If it is necessary for the LOB to provide driver files indicating which customers' accounts they own, a repeatable process and schedule can be defined for each driver file. Specific personnel can be assigned the responsibility of receiving the driver files and logging the source and the date of receipt of each driver file. Driver files may be provided for LOB assignment or specific product types like IDDA, treasury management, ILS, and others. It is preferable to employ computer-executable business rules that can be executed against the wave management database 208 to identify this data. If driver files are used, personnel should be designated as responsible for collecting these files on a regularly scheduled basis and logging the source and date of receipt of each file. If customers are assigned to more than one LOB, each LOB that claims a part of the customer relationship can be identified. All cross-LOB customers can be flagged for special consideration so that the entire customer relationship is evaluated before account wave assignments are finalized. A primary LOB can be assigned to each customer based on the following hierarchy: CIB; private client group ("PCG"—wealth management); retail business banking; retail consumer banking; business other; mortgage; card; and then others.

At step 312, customer conversion impacts can be evaluated to assure that any specific product or system requirements are met in connection with wave assignment. The wave assignment rules can be documented and stored on a SharePoint site or in the wave management database 208 in the system 202, for example, so that they are readily available. A priority hierarchy can be established for the wave assignment rules to promote application of the appropriate business rule and to foster correct wave assignments. The following is an example of a hierarchy for assignment priorities (the priorities are listed in order from highest to lowest): (1) system or product specific assignments; (2) commercial bank assignments; (3) wealth assignments; (4) retail assignments, including (a) system or product related assignments, then (b) specific customer care and risk management ("RM") assignment requests, then (c) dominant wave transaction assignments, then (d) out-of-footprint assignments, and then (e) baseline (e.g., ZIP code) wave assignments. These priorities can be used to provide a general direction for determining which explicit assignment rule should take precedence. However, some explicit assignment rules are related to others and there may be dependencies between the rules. An example of this is FDR control and sub accounts. While it may be important for the control and sub accounts to stay in the same wave (high priority product related assignment), it may also be important for the control and sub account to follow the core DDA relationship, if one exists. In this example, a wave assignment based on a customer care or dominant transaction override may be moving a core DDA relationship at the same time that a control and sub account relationship is being moved. Yet, the iterative nature of embodiments of the present wave assignment process allows the control and sub account wave assignment to "catch up" to the core account wave assignment in a subsequent iteration. In another aspect, it would be preferred to structure the process such that pending core wave assignments can be considered.

At step 314, conflicts across pending wave assignments can be determined and resolved through the relevant LOB or LOBs, as necessary. At step 316, final wave assignments can be submitted, which may include validating explicit wave assignments and formatting data files for submission for wave assignment. At step 318, the wave assignments can be applied in connection with the wave assignment process. This step 318 may involve applying relevant LOB explicit assignment overrides and/or applying centrally processed and baseline wave assignments. At step 320, wave assignments may be validated. This step 320 may involve validating that wave assignments have been applied, identifying and resolving wave assignment conflicts, and/or applying a resolution or other change of assignment in a subsequent iteration or wave of the corporate change.

In various embodiments, specific product related, customer care, and employee related requests may be considered. Specific customer care requests should be validated to assure that no other wave assignment rules related to product or system are violated by the request. In addition, specific requests may not take the whole customer relationship into account, so a full customer profile can be completed for each of these requests to assure no wave breakages are created. It can be seen that it may be necessary to move additional accounts for the customer that were not part of the request in order to keep the customer whole.

Another issue recognized as a problem by the inventor is determining default cost centers for accounts that are to be converted. Once determined, mapping the cost centers should be validated with each iteration of the corporate change and should go through a controlled lock down process similar to the wave assignment process. Problems can result from using incorrect or outdated cost centers, valid cost center but not valid for a given wave, and cost centers that are not appropriate for a given LOB or account type. As a general rule, cost centers can be processed in a manner similar to wave assignment decisions. For example, assign the cost center to the account, test the assignment, and make it clear that the assignment is locked and do not allow business users to alter the cost center without approval.

In various embodiments, release notes and validation scripts can be created for iterations of the wave assignment process. For example, the following items can be included in each version of the release notes: the version of the explicit assignment rule code that was used for this iteration along with a note about any enhancements or bug fixes implemented with this release; the status of the regularly received source files used in the explicit assignment process including the date that the file was published; any new data files or data changes; statistics for the final retail explicit wave assignment file can be recorded along with the report of the number of explicit assignments by type and a report of any records rejected or duplicated during the process; and/or validation results may be recorded for each explicit wave assignment iteration.

In certain embodiments, one or more controlled override processes may be employed to move accounts into or out of an assigned wave. Overrides may be submitted for final approval by the appropriate personnel. For example, overrides for C&IB, PCG, business banking, and consumer banking can be submitted together in an override request file. Each individual controlled override request can be loaded to a controlled override table or other data structure in the system 202. Conflicts between the lines of business on particular accounts can be called to the attention of the appropriate personnel so that a decision can be made about the optimum wave assignment for that account.

Figure 7:
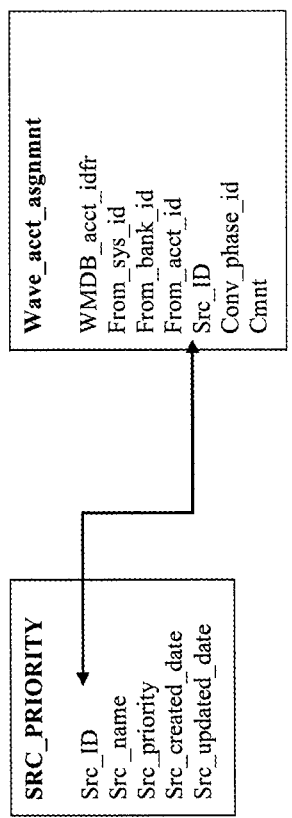

In certain embodiments, identifying and resolving conflicts in priorities for wave assignments can be performed. Even though a wave assignment process may involve the use of priorities to resolve conflicts, such conflicts may not always be consistently identified and the assumption can be made that the highest priority always determines the wave assignment. To promote applying a wave assignment that is not derived from a lower priority default assignment, for example, the same explicit assignments need to be re-applied each time. With regard to FIG. 7, a data structure can be implemented by the system 202 to support processing of net (new or changed) explicit assignments and reduce or remove the need to resubmit the same explicit wave assignments each time to avoid having them overwritten by a lower priority assignment in a subsequent iteration or wave. Accordingly, explicit assignment files can be stored in an src_priority table, as shown in FIG. 7. When each explicit assignment input file is processed, the accounts on the file can be compared to the wave assignment database 208 where the src_ID associated with the wave assignment can be stored. The priority for the existing wave assignment can be looked up based on the src_ID. If the priority associated with the existing wave assignment is higher than the priority associated with the pending wave assignment, then the pending wave assignment can be written to a rejected file or table for further review or action.

In various situations, it may be necessary to conduct research and answer questions about a customer's account wave assignment at a future time. In certain embodiments, a historical record of account wave assignments can be stored in the system 202 and made readily available for research and reporting in a dimension table, for example. An example of a dimension table is illustrated in FIG. 8. Changes in the wave related data elements can be kept as a version with begin and end effective dates, and the most recent record can be flagged as current. In the example shown in FIG. 8, account 12345 received a dominant wave related explicit assignment on Jun. 21, 2009, and no other changes were made to the wave assignment for that account until Jan. 25, 2010. At that point, the wave assignment was moved to wave 4 as a result of a customer care call. The end date of the dominant wave assignment is set at Jan. 25, 2010 and the current flag is set to "N". Then the new wave assignment record is added with a beginning effective date of Jan. 26, 2010, the end effective date is left as null and the current flag is set to "Y".

In various embodiments, the "data as of" date of the source data used by the wave assignment process and by the LOB for applying business rules for explicit assignments can be made the same. In other words, if the wave assignment process is using operational data that is updated daily, then the LOB should have access to that same data source in order to apply business rules for explicit wave assignments. Problems may occur when new accounts and/or customers are picked up by the wave assignment process and then "locked in" under default business rules without the LOB having had the chance to apply business rules for explicit assignment. If the data is not synchronized from a timing perspective, then planning may be needed to schedule appropriate "lock down" periods and specific provisions may be needed to handle new accounts. For example, new commercial loan accounts may require special attention to avoid breaking obligors by automatically assigning new obligation accounts to a default wave. In another example, business lagging accounts may also need special attention to avoid default or baseline wave assignment since such lagging accounts may have special conversion requirements.

In various embodiments, attention to integration of wave assignment results may be required. For example, individual systems such as commercial loans, FDR, and others may make corrections to wave assignments directly in their systems. Accordingly, such "downstream" corrections to wave assignments can be reflected in the wave management database 208 of the system 202 to avoid confusion during validation and to avoid problems with subsequent wave re-assignment for accounts that are withheld from conversion in a particular wave. The wave management database 208 can also be updated consistently across various systems to reflect what accounts were actually converted in a given wave soon after conversion occurs.

The table of FIG. 9 includes an example of a wave impact list that may be employed in connection with managing a corporate change in association with various embodiments of the invention. The table of FIG. 10 includes an example of an account wave assignment summary. This example demonstrates the approach taken to integrate an acquired institution and is focused on converting accounts. It can be seen that account ownership, account transactions, account type and other account level criteria were used to define business rules that determine when an acquired institution account is converted to an acquiring institution account.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, user interface layouts, or screen displays described herein are necessarily intended to limit the scope of the invention.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention.

Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods and systems described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO-.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, computers and computer systems described herein may have the following main components: arithmetic and logic unit (ALU), control unit, memory, and input and output devices (I/O devices). These components can be interconnected by busses, often comprising groups of wires or cables. The control unit, ALU, registers, and basic I/O (and often other hardware closely linked with these sections) can be collectively considered a central processing unit (CPU) for the computer system. The CPU may be constructed on a single integrated circuit or microprocessor.

The control unit (control system or central controller) directs the various components of a computer system. The control system decodes each instruction in a computer program and turns it into a series of control signals that operate other components of the computer system. To enhance performance or efficiency of operation, the control system may alter the order of instructions. One component of the control unit is the program counter, a memory register that tracks the location in memory from which the next instruction is to be read.

The ALU is capable of performing arithmetic and logic operations. The set of arithmetic operations that a particular ALU supports may be limited to adding and subtracting or might include multiplying or dividing, trigonometry functions (sine, cosine, etc.) and square roots. Some may be programmed to operate on whole numbers (integers), while others use floating point to represent real numbers, for example. An ALU may also compare numbers and return Boolean truth values (e.g., true or false). Superscalar computers may contain multiple ALUs to facilitate processing multiple instructions at the same time. For example, graphics processors and computers with SIMD and MIMD features often possess ALUs that can perform arithmetic operations on vectors and matrices. Certain computer systems may include one or more RAM cache memories configured to move more frequently needed data into the cache automatically.

Examples of peripherals that may be used in connection with certain embodiments of the invention include input/output devices such as keyboards, mice, screen displays, monitors, printers, hard disk drives, floppy disk drives, joysticks, and image scanners.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

In various embodiments, the computer systems, data storage media, or modules described herein may be configured and/or programmed to include one or more of the above-described electronic, computer-based elements and components, or computer architecture. For example, the wave assignment system or the wave assignment database may employ such components or architecture. Also, it is contemplated that various users of the assessment construction system may interact or communicate with the system in a variety of ways. In addition, these elements and components may be particularly configured to execute the various rules, algorithms, programs, processes, and method steps described herein.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

What is claimed is:

1. A method for determining a wave assignment for a customer in connection with a corporate change, the method comprising:
    determining a multiple number of waves of a corporate change involving an acquiring institution and an acquired institution, each wave of the multiple number of waves comprising at least a portion of a process by which at least one customer account of the acquired institution and assets associated with the at least one customer account of the acquired institution are transitioned to the acquiring institution, the determining of the multiple number of waves comprising:
    retrieving, with an electronic processor, first customer account data from an electronic data storage medium, wherein the first customer account data is associated with a first plurality of customer accounts of the acquired institution that is to be transitioned to the acquiring institution;
    establishing, with the electronic processor, a baseline wave assignment for second customer account data that is a portion of the first customer account data associated with a second plurality of customer accounts of the first plurality of customer accounts of the acquired institution that are to be transitioned to the acquiring institution, the baseline wave assignment comprising criteria that will provide for the second plurality of customer accounts of the acquired institution to be transferred to the acquiring institution in a baseline wave having the baseline wave assignment;
    applying the baseline wave assignment to the second customer account data associated with the second plurality of customer accounts;
    determining, with the electronic processor, a line of business associated with the first customer account data;
    applying, with the electronic processor, at least one wave assignment to a remainder of the first customer account data associated with the first plurality of customer accounts that is not assigned to the baseline wave assignment in response to at least the baseline wave assignment and the line of business associated with the first customer account data; and
    transferring the at least one customer account of the acquired institution and the assets associated with the at least one customer account in each of the multiple number of waves of the corporate change.

2. The method of claim 1, further comprising applying the wave assignment to the first customer account data in response to an account status for the first customer account data.

3. The method of claim 1, further comprising applying the wave assignment to the first customer account data in response to a computer system reason associated with the first customer account data.

4. The method of claim 1, further comprising applying the wave assignment to the first customer account data in response to a regulatory reason associated with the first customer account data.

5. The method of claim 1, further comprising applying the wave assignment to the first customer account data in response to a product reason associated with the first customer account data.

6. The method of claim 1, further comprising determining the wave assignment for the first customer account data in response to a geographic location of the customer.

7. The method of claim 1, further comprising determining the wave assignment for the first customer account data in response to a business transaction location of a customer account.

8. The method of claim 1, wherein applying the wave assignment to the first customer account data comprises overriding the baseline wave assignment with a different wave assignment.

9. The method of claim 1, further comprising performing a geographical distribution analysis of the first customer accounts of the acquired institution.

10. The method of claim 1, further comprising grouping multiple customer accounts into waves based on their geographical locations.

11. The method of claim 1, further comprising analyzing a transaction related impact on the first customer accounts including assessing a location of a certain volume of transactions associated with the first customer accounts and a geographic location of the first customer accounts.

12. The method of claim 1, wherein applying the wave assignment to the first customer account data includes assigning a dominant wave to the first customer account data based on transaction behavior.

13. The method of claim 1, further comprising determining whether a dominant wave is associated with transactions associated with the first customer account data and applying the wave assignment to the first customer account data based on the geographic residence of a customer associated with each of the first plurality of customer accounts.

14. The method of claim 1, further comprising applying the wave assignment to the first customer account data in connection with a priority hierarchy.

15. The method of claim 1, wherein applying the wave assignment to the first customer account data includes applying an explicit wave assignment to the first customer account data.

16. The method of claim 15, further comprising applying the explicit wave assignment to the first customer account data in response to the line of business associated with the first customer account data.

17. The method of claim 15, wherein applying the explicit wave assignment to the first customer account data includes applying the wave assignment in response to the line of business associated with the first customer account data subject to a priority hierarchy.

18. The method of claim 17, wherein the priority hierarchy includes at least one assignment selected from the group consisting of computer system specific assignments, product specific assignments, and dominant wave transaction assignments.

19. The method of claim 1 wherein the second plurality of customer accounts of the acquired institution comprise a majority of customer accounts of the first plurality of customer accounts that are to be transferred to the acquiring institution in the baseline wave having the baseline wave assignment.

20. The method of claim 1 wherein the line of business of the first customer account data comprises at least one of commercial banking, investment banking, and a credit card account.

* * * * *